J. J. MYERS.
VARIABLE SPEED GEARING.
APPLICATION FILED NOV. 28, 1913.
1,132,603.
Patented Mar. 23, 1915.
2 SHEETS—SHEET 2.
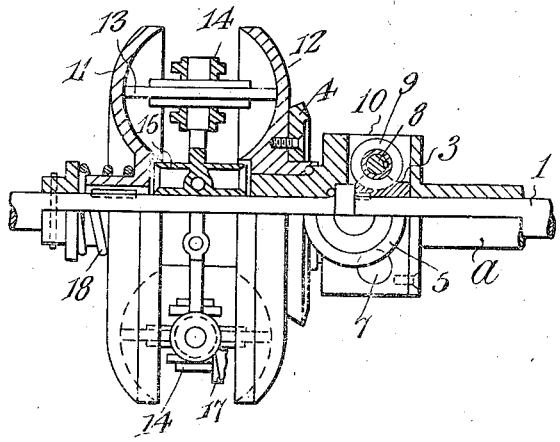
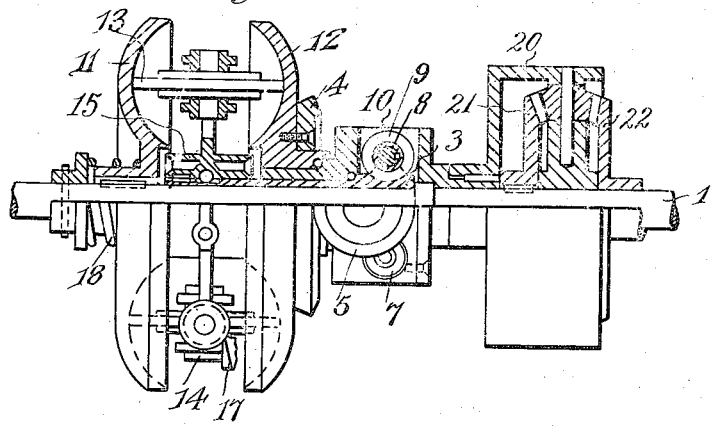
Witnesses
Jas. K. McCathran
H. T. Chapman
James J. Myers, Inventor
By C. G. Giggers
Atty.

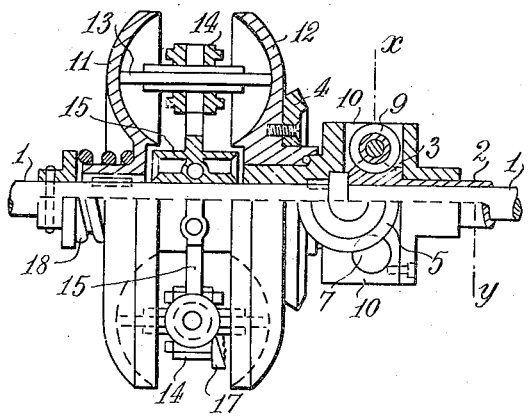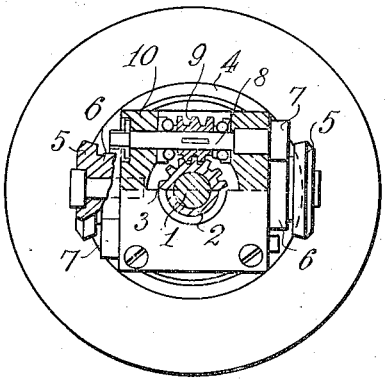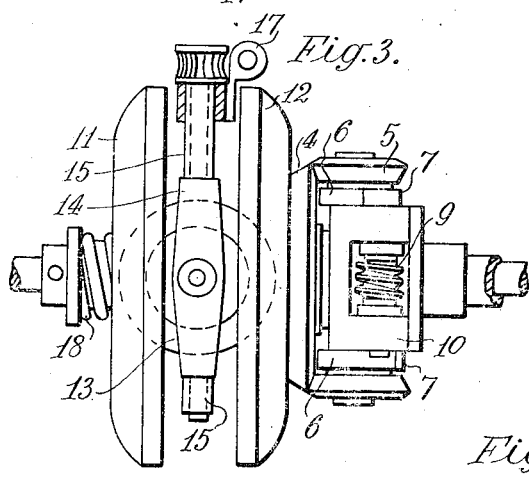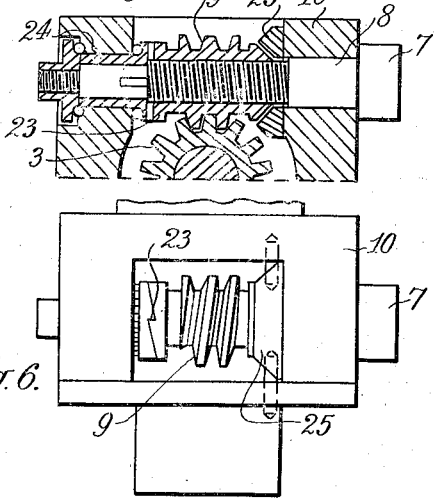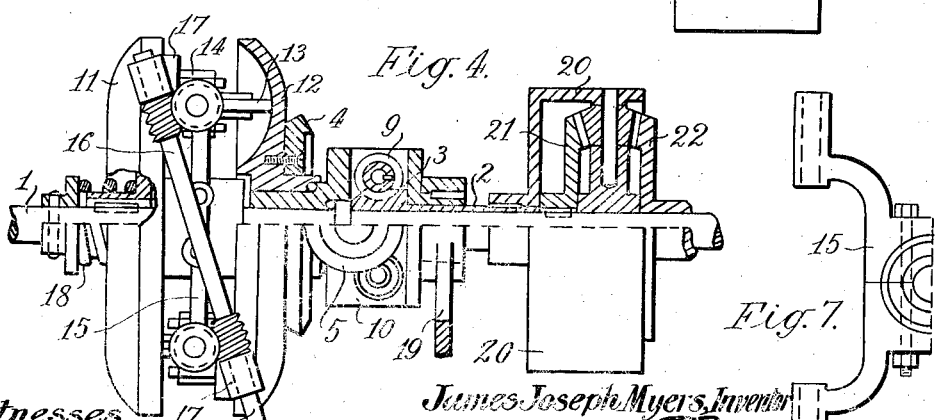

UNITED STATES PATENT OFFICE.

JAMES JOSEPH MYERS, OF THURLES, IRELAND.

VARIABLE-SPEED GEARING.

1,132,603.

Specification of Letters Patent. Patented Mar. 23, 1915.

Application filed November 28, 1913. Serial No. 803,605.

*To all whom it may concern:*

Be it known that I, JAMES JOSEPH MYERS, a subject of His Majesty the King of England, residing at Thurles, in the county of Tipperary, Ireland, have invented certain new and useful Improvements in and Relating to Variable-Speed Gearing, of which the following is a specification.

This invention relates to improvements in those variable speed gearings which are designed to provide means for changing the speed of a driven shaft to any desired degree between zero and a maximum in either direction; while the driving shaft is running at a constant speed.

The present invention comprises the combination of a driving shaft, a driven shaft concentric with said driving shaft, a worm wheel concentric with said driving shaft, a carrier carrying a series of worms in engagement with the worm wheel, pinions on the spindles of the worms, gear wheels in engagement with said pinions and integral with bevel wheels mounted on studs fixed to the carrier at right angles to the driving and driven shafts, a pair of friction disks concentric with the driving shaft the one of said disks being fixed to or mounted slidingly on either said driving shaft or driven shaft and the other of said disks being integral with a bevel wheel adapted to rotate through the bevel and pinion gearing, the worms on the carrier, and a series of friction wheels in engagement with the driving surfaces of said friction disks. By means of this gearing a variable speed may be transmitted to a driven shaft from a driving shaft running at a constant speed in a number of different ways. For example:—(*a*) the carrier may be fixed to the driving shaft and the worm-wheel to the driven shaft, or (*b*) the worm-wheel may be fixed to the driving shaft and the carrier to the driven shaft, or (*c*) the carrier may be fixed to the frame of the machine instead of to the driving shaft, and the worm-wheel to the driven shaft or (*d*) the worm-wheel may be fixed to the frame of the machine and the carrier to the driven shaft.

For transmitting heavy loads it is desirable that the connections should be such that the action of the friction gear is to turn the worms through the bevel and pinion gearing in the same direction as that in which the pressure of the worm-wheel due to the load would tend to turn them and to prevent the worms over-running the motion imparted by the friction gear a worm-controlling device may be conveniently applied by mounting the worms on threaded spindles so that when the spindles are rotated in the direction for giving the proper motion to said worms said worms if not tending to move as fast as the spindles will be forced against shoulders on their respective spindles and will be solidly driven therewith. If however the worms over-run the spindles on which they are mounted they move along said spindles until they respectively come in contact with clutch members on the carrier adapted to check their over-running.

The scope of the gearing may be increased by coupling the driven shaft to the planet ring of a differential gearing and coupling the driving shaft to one of the toothed rings of the same gearing. With such an arrangement if the planet ring is rotated in the same direction as and at half the speed of the toothed ring of the differential gearing keyed to the driving shaft, then the other toothed wheel or power-transmitting member of said gearing will remain at rest. The use of the differential gearing also allows power to be transmitted by the gearing with the carrier or worm-wheel fixed while the reaction of the worm-wheel on the worms is such as to tend to turn them in the same direction as that in which the friction gear turns them, which is the best arrangement for transmitting heavy loads.

My invention is illustrated by way of example in the accompanying drawings.

Figure 1 is a longitudinal view partly in section in which the carrier is shown as fixed to a shaft which may be either the driving or driven shaft. Fig. 2 is a cross section at *x—y* of Fig. 1. Fig. 3 is a plan view of Fig. 1. Fig. 4 is a longitudinal view partly in section of the gearing combined with a differential gearing. Figs. 5 and 6 show detail views of the worm-controlling device applied to the worms, and Fig. 7 is a view of the spider which carries the friction wheels. Fig. 8 is an elevation partly in longitudinal section of a modified form of the invention. Fig. 9 is an elevation partly in longitudinal section of another modified form of the invention.

As illustrated in Fig. 1, the carrier 10 is fixed to shaft 1 and the worm wheel 3 is fixed to the hollow shaft 2 concentric with 1. A bevel wheel 4 concentric with shafts 1 and 2 and integral with a friction disk 12, engages the bevel wheels 5 integral with the gear wheels 6 and mounted on studs fixed to the carrier 10. The gear wheels 6 engage pinions 7 integral with spindles 8 on which are mounted worms 9 gearing with the worm wheel 3. A friction disk 11 is slidingly mounted on shaft 1 and bears against friction wheels 13 which in turn bear against the friction disk 12 which is loosely mounted on the boss of the carrier 10 or on the shaft 1. The friction wheels 13 are mounted in bosses 14 having pivots which are perpendicular to the axes of the friction wheels and which turn in bearings in a spider 15 mounted loosely on shaft 1. The bosses 14 may be turned simultaneously by means of worms fixed to a spindle 16 (Fig. 4) mounted in bearings in brackets 17 fixed to the spider 15. The friction disks 11 and 12 and friction wheels 13 are held in contact by the springs 18. The spider 15 may be prevented from turning by some part of it or of the spindle 16 bearing against the frame in such a manner as not to prevent the spring 18 from holding the parts of the friction gear in contact.

On referring to Figs. 1, 2 and 3 it will be obvious that either of the shafts 1 or 2 may be the driving shaft, the other being the driven shaft. Supposing 1 to be the driving shaft, its constant speed of rotation is transmitted to the carrier 10 and consequently through the worms 9 to the worm wheel 3 and the driven shaft 2. A rotation relative to the carrier 10 is also transmitted to the worm-wheel 3 and the driven shaft 2 from the friction disk 12 through the bevel wheels 4 and 5 gear wheels 6 and 7 and worms 9 and this rotation may be altered by changing the directions of the axes of the friction wheels 13, thus varying the speed of the driven shaft 2. The speed of the driven shaft will be faster or slower than that of the driving shaft according to which ends of the spindles 8 the pinions 7 are on, and also according to whether the worms 9 are right or left handed. If 2 is the driving shaft the action is similar except that the friction disk 11 is now rotated by the driven shaft instead of by the driving shaft, and its speed will be varied by changing the directions of the axes of the friction wheels 14. In both cases the worms will be turning in the best direction for the transmission of power and the worm controlling device may be applied when the driven shaft is arranged to run at a lower speed than the driving shaft. The proportions of the gears when 1 is the driving shaft may be such that the speed of the driven shaft may be reduced through zero so as to give a reverse rotation, but the worm-controlling device will be effective only during the forward rotation.

In Figs. 5 and 6 I show the worm-controlling device applied to the worms for transmitting heavy loads. The series of worms 9 carried by the carrier 10 are mounted on threaded spindles 8, so that when the spindles are rotated in the direction for giving the proper motion to said worms, said worms if not tending to move as fast as the spindle are forced against shoulders 23 mounted on sleeves 24 keyed to said spindles 8, and are driven solidly therewith. If however, the worms 9 over-run their spindles 8 they move along said spindles until they respectively come into contact with friction or brake members 25 on the carrier 10 which are adapted to check their over-running.

Fig. 4 shows the carrier fixed to the frame of the machine, and the application of a differential gear. If the worms are arranged to drive the shaft 2 in the same direction as the driving shaft 1 and if shaft 2 is coupled to planet ring 20 and shaft 1 to gear wheel 21, then, when the speed of planet ring 20 is half that of shaft 1, the speed of power-transmitting wheel 22 will be zero and as the speed of shaft 2 diminishes that of wheel 22 will increase. It will be in the opposite direction to that of the driving shaft 1 and the rotation of the worms will be in the best direction for the transmission of power. If the shaft 2 runs faster than half the speed of the shaft 1, the wheel 22 will be driven in the same direction as shaft 1, but the rotation of the worms will not be in the best direction for the transmission of power and the worm controlling device will not operate. Instead of shaft 1 being the driving shaft it can be made the driven shaft and the wheel 22 can be made the driving member, the worms being so arranged that a speed variable from zero to a maximum may be imparted to the driven shaft with the worms turning the worm-wheel in the direction best suited for transmitting heavy loads.

In Fig. 8 the driving shaft $a$ is integral with the carrier 10 and the worm wheel 3 is fitted to the driving shaft 1 as shown. In Fig. 9, however, the worm wheel 3 is slidably connected to the spider 15 which is prevented from rotating by being in contact with the frame. In the modifications of Figs. 4 and 9, respectively, a differential gear consisting of the planet ring 20 and the gear wheels 21 and 22 is employed, so that the pressure due to the load may tend to turn the worms in the same direction as for driving by the friction gearing and also that the speed may be gradually variable down to zero. These conditions are, however, obtained without the use of differential gearing in the forms of the invention shown in Figs. 1 and 8, respectively.

What I claim as my invention and desire to secure by Letters Patent of the United States is:—

1. In variable speed gearing, a worm controlling device comprising a carrier, a series of threaded spindles mounted in the carrier, a series of worms each mounted on a respective one of the threaded spindles for movement lengthwise thereof by the threads of the spindles, means at one limit of travel of each worm on its spindle for positively connecting the worm to the spindle, and a friction brake structure at the other end of the travel of the worm on its spindle and with which the corresponding end of the worm is adapted to engage.

2. In variable speed gearing, a worm controlling device comprising a series of worms, a spindle for each worm upon which the worm is threaded for longitudinal movement thereon, and means at one limit of the travel of each worm along its spindle for connecting the worm and spindle solidly together, and means at the other limit of travel of the worm on the spindle for checking over-running of the worm.

3. A variable speed gearing comprising in combination a drive shaft, a driven shaft concentric therewith, a worm wheel concentric with the drive shaft, a carrier concentric with the shafts, a series of worms on the carrier in engagement with the worm wheel, pinions on the carrier fast to the worms, gear wheels also on the carrier in engagement with the pinions, bevel wheels fast to the gear wheels and also mounted on the carrier to rotate on axes at right angles to that of the driving and driven shafts, a bevel wheel in engagement with the first-named bevel wheels, a friction disk connected to the last-named bevel wheel and mounted for rotation about the axis of the drive shaft, another friction disk in opposed relation to the first-named friction disk and spaced therefrom and provided with means for constantly urging it toward the first-named friction disk, and friction wheels located between and engaging the friction disks and mounted for movement on axes perpendicular to the axes of the friction wheels, whereby power is transmitted from the drive to the driven shafts through the bevel gear, and the friction disks and gearing connecting them to the worms serve to regulate the speed of transmission and are relieved from the transmission of driving power.

In testimony whereof I have signed this specification in the presence of two subscribing witnesses.

JAMES JOSEPH MYERS.

Witnesses:
    JAMES SMITH,
    CHRISTOPHER SMITH.